J. MADSEN.
COMBINED TEA KETTLE AND SIGNAL.
APPLICATION FILED MAY 5, 1914.

1,161,713.

Patented Nov. 23, 1915.

Witnesses

Inventor
Jorgen Madsen
By Franklin N. Hough
Attorney

UNITED STATES PATENT OFFICE.

JORGEN MADSEN, OF PERTH AMBOY, NEW JERSEY.

COMBINED TEA-KETTLE AND SIGNAL.

1,161,713.　　　　Specification of Letters Patent.　　Patented Nov. 23, 1915.

Application filed May 5, 1914. Serial No. 836,518.

*To all whom it may concern:*

Be it known that I, JORGEN MADSEN, a citizen of the United States, residing at Perth Amboy, in the county of Middlesex and State of New Jersey, have invented certain new and useful Improvements in Combined Tea-Kettles and Signals; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in combined tea kettles and whistles adapted to signal when the water within the kettle generates sufficient steam to sound the whistle.

More specifically, the invention consists of a kettle having a closed top and a single opening utilized both for filling and dispensing water in the kettle and in which opening a removable, combined whistle and cap is mounted.

The invention is illustrated in the accompanying drawings, in which:—

Figure 1:
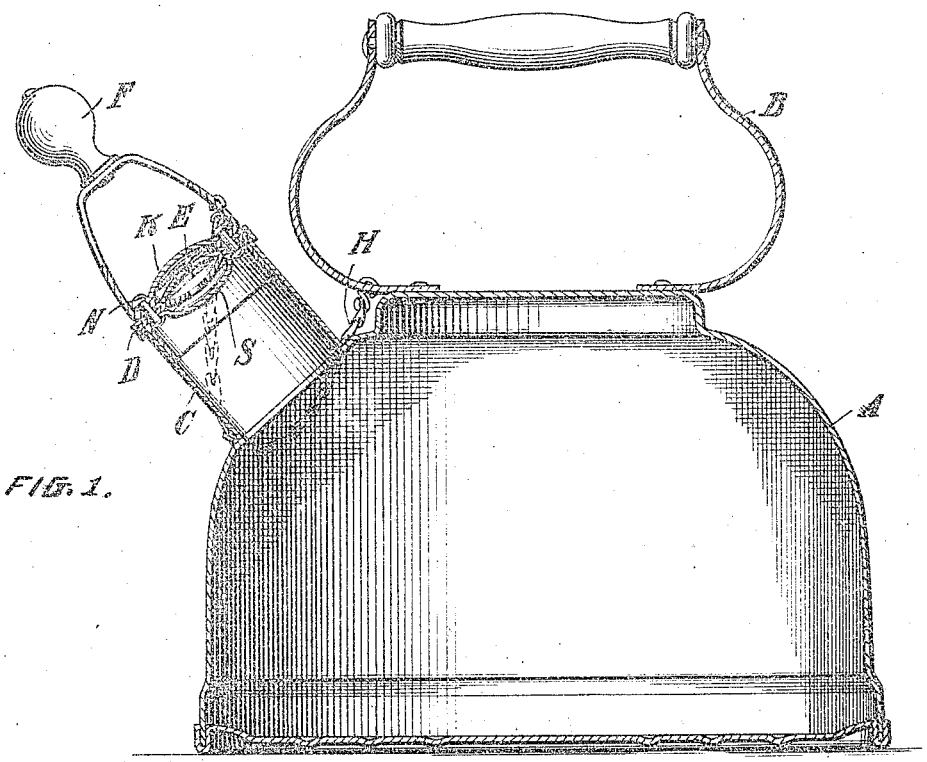
Figure 2:
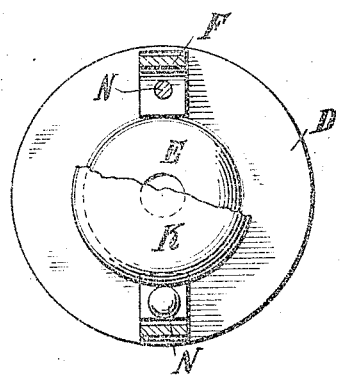
Figure 3:
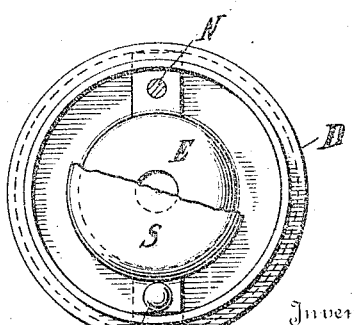

Figure 1 is a vertical central sectional view. Fig. 2 is a sectional view through the handle upon the cap showing the outer face of the latter, and Fig. 3 is a bottom plan view of the cap.

Reference now being had to the details of the drawings by letter, A designates a kettle having a closed top to which a handle B is fixed. At any suitable location, preferably in the dome of the kettle, a cylindrical shell C projects about the marginal edge of an opening which may be utilized for either filling or dispensing water. A flanged cap D telescopes within said shell and has a whistle E formed therein, and F is a handle secured to the outer face of the cap, forming convenient means whereby the latter may be adjusted in place within the shell or removed therefrom. A chain H is fastened at one end to the handles of the cap and kettle, forming convenient means for holding the cap adjacent to the kettle. A disk K is fastened by the rivets N' which secure the angled ends of the handle F, said disk being spaced apart from the opening in the whistle and provided for the purpose of deflecting steam laterally to prevent the hand of the operator taking hold of the handle upon the cap from being burned. Upon the opposite face of the cap is a second disk S also held by the same rivets and spaced apart from the inner face of the cap and which is provided for the purpose of preventing any one tampering with the whistle to clog the same.

By the provision of a tea kettle made in accordance with my invention, it will be noted that a simple and efficient means is afforded whereby the usual removable cover is dispensed with and a single opening used for filling and dispensing is utilized and in which the whistle and cap are held, the whistle serving as a signal when the water boils or generates sufficient steam to sound the whistle.

What I claim to be new is:

In combination with a cylindrical shell forming the inlet and outlet of a kettle, a flanged cap telescoping within said shell, oppositely bulging disks with registering apertures therein, and other bulging disks secured one inside and the other outside the cap and spaced apart from the apertured disk, and a handle fastened to said cap.

In testimony whereof I hereunto affix my signature in presence of two witnesses.

JORGEN MADSEN.

Witnesses:
A. L. HOUGH,
A. R. FOWLER.